US011872713B2

(12) United States Patent
Xu et al.

(10) Patent No.: US 11,872,713 B2
(45) Date of Patent: Jan. 16, 2024

(54) RAZORS AND RAZOR CARTRIDGES WITH COLORED BLADES

(71) Applicant: The Gillette Company LLC, Boston, MA (US)

(72) Inventors: Laura Xu, Natick, MA (US); Kenneth James Skrobis, Maynard, MA (US); Neville Sonnenberg, Newton, MA (US); Ronald Richard Duff, Jr., Shrewsbury, MA (US); Joseph Allan DePuydt, Salem, NH (US)

(73) Assignee: The Gillette Company LLC, Boston, MA (US)

( * ) Notice: Subject to any disclaimer, the term of this patent is extended or adjusted under 35 U.S.C. 154(b) by 209 days.

(21) Appl. No.: 16/942,955

(22) Filed: Jul. 30, 2020

(65) Prior Publication Data

US 2021/0031388 A1 Feb. 4, 2021

Related U.S. Application Data

(60) Provisional application No. 62/881,202, filed on Jul. 31, 2019.

(51) Int. Cl.

*B26B 21/54* (2006.01)
*B26B 21/22* (2006.01)
*B26B 21/40* (2006.01)

(52) U.S. Cl.

CPC ............ *B26B 21/54* (2013.01); *B26B 21/227* (2013.01); *B26B 21/40* (2013.01)

(58) Field of Classification Search

CPC ......... B26B 21/14; B26B 21/16; B26B 21/22; B26B 21/40; B26B 21/54; B26B 21/56; B26B 21/58; B26B 21/60

(Continued)

(56) References Cited

U.S. PATENT DOCUMENTS 2,137,817 A * 11/1938 Tuerff ....................... C23C 8/14 148/284
2,703,451 A * 3/1955 Hensel et al. ...... B26B 21/4087 30/41.7

(Continued)

FOREIGN PATENT DOCUMENTS

CN 101090808 A 12/2007
CN 101410229 A 4/2009

(Continued)

OTHER PUBLICATIONS

International Search Report and Written Opinion; Application Ser. No. PCT/US2020/070326; dated Nov. 10, 2020, 12 pages.

*Primary Examiner* — Jason Daniel Prone

(74) *Attorney, Agent, or Firm* — Kevin C. Johnson; Joanne N. Pappas

(57) ABSTRACT

Razors cartridges including a guard, a cap, and at least two blades with parallel sharpened edges located between the guard and cap are provided. The first blade has a first color and a second blade has a second color, where the first color is different than the second color. The blade color corresponds to an attribute of the blade (e.g., low cut force) that the color is disposed on or an attribute of the razor cartridge (e.g., sensitive skin). The color of the blade corresponds to a target user of the razor cartridge (e.g., male or female). The first blade defines a blade edge near or nearest the guard and a second blade defines a blade edge near or nearest the cap.

11 Claims, 6 Drawing Sheets

(58) Field of Classification Search
USPC .......................................................... 30/47–51
See application file for complete search history.

(56) References Cited

U.S. PATENT DOCUMENTS

| | | | | |
|---|---|---|---|---|
| 3,664,884 | A * | 5/1972 | Underwood | C23C 8/10 148/242 |
| 4,981,756 | A | 1/1991 | Rhandhawa | |
| 5,388,331 | A * | 2/1995 | Doroodian-Shoja Siamak | B26B 21/443 30/41.7 |
| 5,630,275 | A | 5/1997 | Wexler | |
| 7,284,461 | B2 * | 10/2007 | Skrobis et al. | B26B 21/60 148/287 |
| 7,673,541 | B2 * | 3/2010 | Skrobis et al. | C21D 1/76 148/287 |
| 10,960,559 | B2 | 3/2021 | Kim et al. | |
| 2002/0000041 | A1 * | 1/2002 | Doroodian-Shoja | B26B 21/443 30/41.7 |
| 2005/0268470 | A1 * | 12/2005 | Skrobis | B26B 21/60 30/346.54 |
| 2006/0130612 | A1 * | 6/2006 | Skrobis et al. | C21D 11/00 76/104.1 |
| 2007/0062047 | A1 * | 3/2007 | Zhuk | B26B 21/56 30/50 |
| 2007/0131060 | A1 * | 6/2007 | Kelsey et al. | C23C 8/10 76/104.1 |
| 2010/0011590 | A1 | 1/2010 | Depuydt et al. | |
| 2010/0011595 | A1 | 1/2010 | Claus et al. | |
| 2010/0299931 | A1 | 12/2010 | Marchev et al. | |
| 2011/0126413 | A1 * | 6/2011 | Szczepanowski | B26B 21/44 30/77 |
| 2011/0139649 | A1 * | 6/2011 | Marcinkowski | B65D 25/20 53/410 |
| 2014/0026424 | A1 | 1/2014 | Oglesby et al. | |
| 2015/0328789 | A1 | 11/2015 | Skrobis et al. | |
| 2016/0167242 | A1 | 6/2016 | Noh et al. | |
| 2018/0043561 | A1 | 2/2018 | Nisby et al. | |
| 2018/0079095 | A1 * | 3/2018 | Robertson et al. | B26B 21/521 |
| 2018/0162000 | A1 | 6/2018 | Duff, Jr. et al. | |
| 2018/0264669 | A1 | 9/2018 | Howell | |
| 2020/0156273 | A1 * | 5/2020 | Fitzgerald | B26B 21/52 |
| 2021/0031390 | A1 | 2/2021 | Skrobis et al. | |

FOREIGN PATENT DOCUMENTS

| | | | |
|---|---|---|---|
| CN | 101410230 | A | 4/2009 |
| CN | 101489740 | A | 7/2009 |
| CN | 102099165 | A | 6/2011 |
| CN | 102216039 | A | 10/2011 |
| CN | 109641361 | A | 4/2019 |
| EP | 3599066 | A1 | 1/2020 |
| JP | 2005261544 | A | 9/2005 |
| JP | 2017536947 | A | 12/2017 |
| JP | 2019527604 | A | 10/2019 |
| JP | 2020014837 | A | 1/2020 |
| RU | 2004117619 | A | 1/2006 |
| WO | 2005120783 | A1 | 12/2005 |
| WO | 2007110848 | A1 | 10/2007 |
| WO | 2010008981 | A1 | 1/2010 |

* cited by examiner

RAZORS AND RAZOR CARTRIDGES WITH COLORED BLADES

FIELD OF THE INVENTION

This invention relates to razors and more particularly to razor cartridges and even more particularly to aspects of the razor blades in the razor cartridges.

BACKGROUND OF THE INVENTION

In shaving, it is desirable to achieve a close shave, while also providing good shaving comfort. Commercially available razors and razor cartridges provide razor cartridges which have razor blades with sharp cutting edges. The razor blades within one razor cartridge of each razor offering are generally identical. From the vantage point of a target user, consumer, or shopper, the razor blades in any razor cartridge, appear identical (e.g., a gray or silver color of steel). Further, razor blades of different manufacturers manufactured differently also are generally indistinguishable. This confuses the consumer as to the benefits or attributes of a particular razor offering over another, and in particular, differences in razor blade type. It also does not allow a manufacturer or retailer the ability to distinguish the blades as for instance, the color of the blades in each razor cartridge is identical (e.g., a silver color of steel). Thus, a disadvantage of these commercially available products is that there is no correspondence of a type of razor blade or razor cartridge to a target user and there is no visible or direct communication of the benefit of an attribute or appearance of a type of razor blade or razor cartridge provided to a target user.

It is desirable to provide a razor having a correlation or correspondence between a razor blade in a razor cartridge or a type of razor cartridge and a target user.

It is desirable to provide a razor cartridge having a plurality of razor blades contained therein where attributes of the razor blade are communicated to a target user by a visible color.

SUMMARY OF THE INVENTION

The present invention is directed to a razor cartridge having a plurality of razor blades, a first blade of the plurality of razor blades including a first color and a second blade of the plurality of razor blades including a second color, wherein the first color and the second color are different colors. The first color is disposed on a blade body of the first blade, on a cutting edge of the first blade, or a combination thereof. The second color is disposed on a blade body of the second blade, on a cutting edge of the second blade, or a combination thereof. The first color and the second color are comprised of any colors. The first and second colors are distinguishable by wavelength. The first color corresponds to a wavelength between 380 nanometers and 740 nanometers. The second color corresponds to a wavelength between 380 nanometers and 740 nanometers. A third blade has a third color disposed on a body of the third blade, on a cutting edge of the third blade, or a combination thereof. The third color is different than the first color, different than the second color, or different than both the first and the second colors. The third color is the same color as the first color or the same color as the second color. A fourth and fifth blade may be present comprising a fourth and fifth color.

In a preferred embodiment, the first color corresponds to an attribute of the first blade and wherein the second color represents an attribute of the second blade. The attribute of the first blade is different than the attribute of the second blade.

The attributes of the first blade and the second blade are comprised of one or more of blade sharpness, blade efficiency, blade safety, blade profile, blade tip size, blade coating material, blade substrate material, thickness of coating, number of coating layers, blade position, blade exposure, blade surface, blade cut force, blade angle, blade degradability, and blade processing conditions.

At least one of the first or the second colors is green corresponding to an increased blade degradability of the first or the second blade or the first or the second blade includes sustainable, recyclable or compostable materials. At least one of the first or the second colors is blue corresponding to the blade cut force.

In an alternate embodiment, the first blade attribute determines a blade position of the first blade in the razor cartridge and the second blade attribute determines a blade position of the second blade in the razor cartridge.

The first blade attribute includes the blade cut force being lower than the second blade attribute.

In another embodiment, at least one of the first or the second colors correspond to a target user of the razor cartridge. The target users comprise one or more of male, female, skin color, skin type, shave-related sensitivity, LGBTQ, country affiliation, geographic affiliation, sport, sporting event, team affiliation, group affiliation, or school affiliation.

The colors of the first and second blades in the razor cartridge are includes blue, gold, silver, bronze, red, pink, green, violet/purple, white, black, brown, orange, yellow, wavelengths thereof, pantones thereof, or any combination thereof.

The first or the second color is a blue color corresponding to the target user identifying as a male. The first or the second color is cyan, pink, red, orange, purple or any combination thereof, corresponding to the target user identifying as a female. The first or the second color is brown or black corresponding to the target user having a brown or black skin color. The first or the second color is green or turquoise corresponding to the target user having sensitive skin or irritation prone skin. A third blade having a third color, the same or different than the first or the second colors is provided.

Still further, the blade colors are visible to human eyes and the blade colors fall within wavelengths of a color spectrum of visible light. Each blade of the plurality of blades in the razor cartridge is a different color.

Each of the blades have colors of a rainbow including red, orange, yellow, green, blue, or violet.

In another embodiment, a razor cartridge including a plurality of blades, a first blade of the plurality of blades having a change in color from any of remaining blades in the cartridge.

In another embodiment, a razor cartridge including at least one pair of razor blades having dissimilar colors is provided.

In another embodiment, a razor cartridge including a plurality of blades, at least one of the plurality of blades including a color, the color corresponding to a target user of the razor cartridge or an attribute of the razor blade or a combination of both is provided. The color is comprised of one or more color of a visible color spectrum. The color is blue, gold, bronze, red, pink, green, violet/purple, white, black, brown, orange, yellow, pantones thereof, or any combination thereof. The color is a blue color corresponding to the target user being a male or identifying as a male. The color is pink, red, orange, purple or any combination thereof, corresponding to the target user being a female or identifying as a female. The color is brown or black corresponding to the target user having a brown or black skin color. The color is cyan or green corresponding to the target user having sensitive skin or irritation prone skin. The color is cyan or green corresponding to a razor cartridge that is includes sustainable, recyclable, or compostable materials. Each of the blades in the razor cartridge is the same color. Each of the blades in the razor cartridge is a different color.

The color is visible to the target user or consumer. The color is disposed on a blade body of the blade, on a cutting edge of the blade, or a combination thereof.

In another embodiment, a razor cartridge including a plurality of razor blades and a plurality of colors disposed on the plurality of razor blades. The plurality of colors correspond to one or more attributes of a blade, one or more attributes of the razor cartridge, a target user, or combinations thereof.

In another embodiment, a razor cartridge including one or more blades, at least one of the one or more blades including a color, the color corresponding to one or more attributes of the at least one blade. One or more attributes comprise a blade profile of at least one of the one or more blades, a blade coating thickness of at least one of the one or more blades, a blade material of at least one of the one or more blades, or any combination thereof.

Still further, a razor cartridge including one or more colored blades, each disposed in a blade position, a color of the colored blades determining the blade position is provided in the present invention.

In yet another embodiment, a razor cartridge including a plurality of razor blades, at least one of the plurality of blades including a color visible to a shopper is provided in the present invention. A blue color corresponds to a male product, a pink or red color corresponds to a female product, a gray color corresponds to a skin safe razor blade. The color is comprised within a coating on the blades or within a substrate of the blades.

In still yet another embodiment, there is provided one or more razors, the razors each having one or more blades, at least one of the one or more blades of the one or more razors having a color visible to a consumer from within the package.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

While the specification concludes with claims particularly pointing out and distinctly claiming the subject matter that is regarded as the present invention, it is believed that the invention will be more fully understood from the following description taken in conjunction with the accompanying drawings.

DETAILED DESCRIPTION OF THE INVENTION

Figure 1:
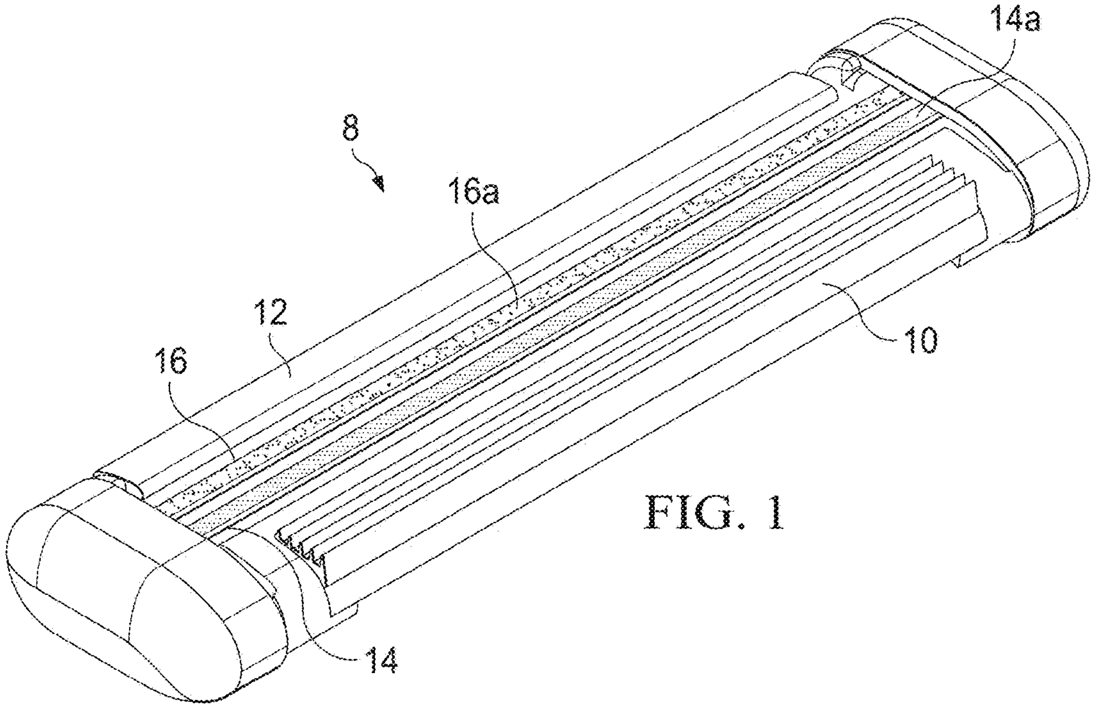
FIGS. 1-4 depict razor cartridges having multiple blades where one or more blades have a color different than another blade positioned in the razor.

In the present invention, a razor cartridge having a cap, guard and two or more parallel sharpened blades, is provided. The term "first blade" refers to a blade in the razor cartridge comprising a first color. Likewise, term "second blade" refers to a blade in the razor cartridge comprising a second color. The first color is desirably a different color than the second color. Any permutations of blades and colors are contemplated in the present invention.

The present invention contemplates that at least one of the first color or the second color are visible to a target user and can correspond to a particular target user. A "target user" is a person who is the intended user or consumer of the product, in this case, the razor or the razor cartridge. A target user of the present invention may also be the shopper in a physical retail store looking at the shelf of products or an online retail storefront looking at listings of products. While it may occur that a shopper is not the target user but is shopping for a target user, such as the case where a wife is purchasing a razor for her husband, the present invention contemplates that the color of the blade corresponds to the target user.

A target user of the present invention can be defined as anyone or a group of users that the razor or razor cartridge is or can be marketed to. For instance, target users of the present invention include, but are not limited to, one or more of the following: male, female, skin color (e.g., brown), skin type (e.g., aged), shave-related sensitivity (e.g., irritation-prone, in-grown hair propensity), LGBTQ, country affiliation (e.g., USA), geographic affiliation, sport (e.g., basketball), sporting event (e.g., Olympics, World Cup, UEFA cup, NASCAR, Formula 1, team affiliation (e.g., Boston Red Sox), group affiliation (e.g., workplace, non-profit), school affiliation (e.g., Harvard University).

Exemplary razor blade colors for either the first color or the second color and corresponding target users are indicated below in TABLE 1.

TABLE 1

Exemplary Blade Colors and Target Users

| EXEMPLARY BLADE COLOR(S) | EXEMPLARY CORRESPONDING TARGET USER(S) |
|---|---|
| PINK | FEMALE |
| RED | FEMALE |
| ORANGE | FEMALE |
| PURPLE/LAVENDER/ VIOLET | FEMALE |
| LIGHT BLUE | FEMALE |
| LIGHT GREEN | FEMALE, SENSITIVE SKIN |
| BLUE | MALE |
| GREEN | MALE, SENSITIVE SKIN, SUSTAINABLE |
| CYAN | MALE |
| MAGENTA | MALE |
| YELLOW | MALE |
| RED | MALE |
| BLACK | MALE, AFRICAN ANCESTRY |

TABLE 1-continued

| Exemplary Blade Colors and Target Users | |
|---|---|
| EXEMPLARY BLADE COLOR(S) | EXEMPLARY CORRESPONDING TARGET USER(S) |
| BROWN | MALE, AFRICAN ANCESTRY |
| GRAY | MALE |
| CYAN | FEMALE, MALE |
| YELLOW | FEMALE, MALE |
| GOLD | FEMALE, MALE, SPORTS, OLYMPICS, ANNIVERSARY |
| SILVER | FEMALE, MALE, SPORTS, OLYMPICS, ANNIVERSARY |
| BRONZE | FEMALE, MALE, SPORTS, OLYMPICS |
| WHITE | FEMALE, MALE, SENSITIVE SKIN |
| INDIGO/PURPLE | ROYAL |
| MULTI COLOR | COUNTRY/FLAG, TEAM, LGBTQ |
| RED, WHITE, BLUE | USA, FRANCE, FLAG |
| RED, ORANGE, YELLOW, GREEN, BLUE, INDIGO, VIOLET | LGBTQ, SCHOOLS |

The present invention also contemplates that the first color and the second color correspond to a first attribute of a first blade and a second attribute of a second blade, respectively. Preferably, the first attribute is different than the second attribute.

An attribute of a razor blade can be defined as a property or characteristic of the razor blade, such as a performance characteristic or a benefit that the razor blade provides during or after shaving. Attributes of the razor blades contemplated by the present invention include but are not limited to, blade sharpness (e.g., sharp tip), blade efficiency (e.g., fast shave) blade safety (e.g., comfort), blade profile (e.g., thin, wide), blade tip size (e.g., wide), blade coating material (e.g., hard coating), blade substrate material (e.g., steel), thickness of coating (e.g., extra thick), number of coating layers (e.g., 2, 3, 4), blade position (e.g., closer to guard, closer to cap, slots 1, 2, 3, 4, 5, etc.), blade exposure (e.g., greater than zero), blade surface (e.g., smooth, uniform, discontinuous), blade cut force (e.g., low cut force, high cut force), blade angle (e.g., angle greater than 20 degrees), blade degradability (e.g., compostable, sustainable) and blade processing conditions (e.g., deposition, manufacturing, bent blade, supported blade).

While stainless-steel is the desired substrate of the razor blade of the present invention, as it is the common substrate for razor blades, blade substrates comprised of another metal or metals, ceramic, composite, plastic, glass, or any combination thereof, are also contemplated in the present invention. One substrate material which may facilitate producing an appropriately sharpened edge of the present invention is a martensitic stainless-steel with smaller more finely distributed carbides. This type of steel may have similar overall carbon weight percent. A fine carbide substrate provides for a harder and more brittle after-hardening substrates, and enables the making of a thinner, stronger edge. An example of such a substrate material is a martensitic stainless-steel with a finer average carbide size with a carbide density of 90, 100, 200, 300, 400 carbides per 100 square micrometers, to 600, 800, 1000 carbides or more per 100 square micrometers as determined by Scanning Electron Microscopy, SEM 4000× or higher.

Exemplary razor blade colors (e.g., for either the first color or the second color) and corresponding exemplary attributes are indicated in TABLE 2 of the present invention.

TABLE 2

| Exemplary Blade Color to Attribute Combinations | |
|---|---|
| EXEMPLARY BLADE COLOR(S) | EXEMPLARY CORRESPONDING ATTRIBUTE(S) |
| PINK | BLADE SAFETY |
| RED | BLADE CLOSENESS |
| ORANGE | BLADE COMFORT |
| PURPLE/LAVENDER/VIOLET | BLADE EFFICIENCY |
| LIGHT BLUE | THIN TEFLON COATING |
| LIGHT GREEN | FOR SENSITIVE SKIN |
| BLUE | LOW CUT FORCE, EFFICIENCY |
| GREEN | DEGRADABLE, SUSTAINABLE |
| BLACK | DLC COATED BLADE |
| BROWN | PLATINUM CHROME COATED BLADE |
| GRAY | BLADE SAFETY AND COMFORT |
| CYAN | BLADE WITH LOW CUT FORCE |
| YELLOW | HIGHLY LUBRICIOUS BLADE |
| GOLD | MULTIPLE ATTRIBUTES SUCH AS CUT FORCE, TIP SIZE, ANGLE, EFFICIENCY |
| SILVER | BLADE SAFETY AND COMFORT |
| BRONZE | BLADE SUBSTRATE - CERAMIC BLADE |
| WHITE | BLADE SAFETY AND COMFORT |
| INDIGO/PURPLE | BLADE SUBSTRATE MATERIAL |
| MULTI COLOR | MULTIPLE ATTRIBUTES SUCH AS BLADE ANGLE AND BLADE TIP SIZE |
| RED, WHITE, BLUE | COATING THICKNESS VARIATION |
| BLUE, GRAY/SILVER | EFFICIENCY, SAFETY/COMFORT |
| MAGENTA | BLADE PROFILE |

Figure 6:
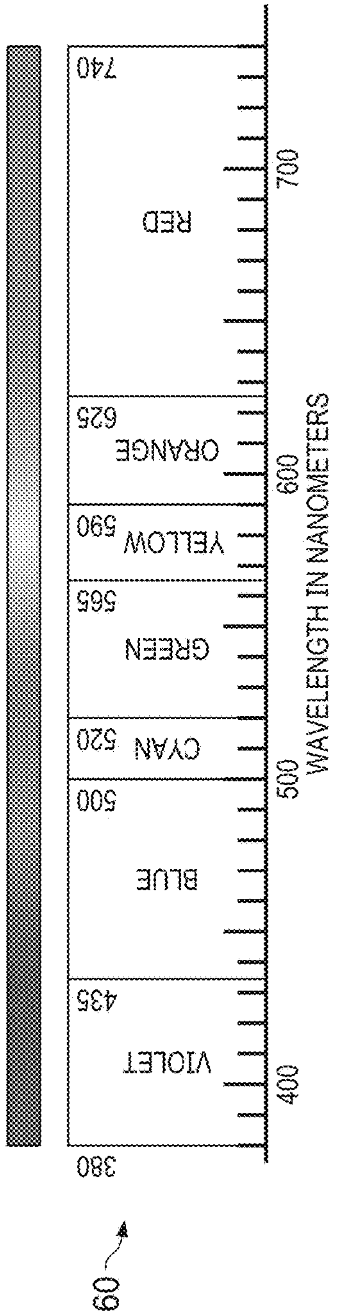
FIG. 6 is a diagram of the visible color spectrum.

In the present invention, at least a portion of a razor blade comprises at least one color. Desirably, a first portion of a first razor blade comprises a first color and a second portion of a second razor blade comprises a second color. The color is defined as any color comprised in the visible spectrum. The "visible spectrum," as used herein, is the portion of the electromagnetic spectrum that is visible to the human eye, Electromagnetic radiation in this range of wavelengths is called visible light or simply light. A typical human eye will respond to wavelengths from about 380 to 740 nanometers. Any colors in the visible spectrum 60 shown in FIG. 6, within the wavelengths of the spectrum or comprised of combinations of wavelengths in this spectrum, are contemplated razor blade colors in the present invention. For instance, a blue color would generally fall within the wavelength range of about 435 nanometers to about 500 nanometers as shown in FIG. 6. A white color can be considered a combination of all colors or an equal combination of all wavelengths of visible light, while a black color can be considered the lack of any visible wavelength of light. A gray color can be considered a combination of two or more colors or as an intermediate between a black and a white color. Thus, generally, large amounts of all wavelengths will produce white, few will produce gray, and none will produce black.

Determining color on a razor blade can be achieved by various techniques. One technique for determining color on a razor blade of the present invention comprises measuring the wavelength. The wavelength can be measured using a spectrophotometer. A spectrophotometer is an instrument that measures transmission or apparent reflectance of visible light as a function of wavelength, permitting accurate analysis of color or accurate comparison of luminous intensities of two sources or specific wavelengths.

The resultant wavelength value provided by a spectrophotometer analyzing a color of a razor blade is within the range of the wavelengths of the visible spectrum. Generally, the wavelength values for colors in the visible spectrum range from about 380 nanometers to about 740 nanometers. It should be noted that a color can be comprised of two or more colors. A color can be comprised of two or more wavelength spectrum ranges or by combinations or overlapping areas of wavelength spectrum ranges. For instance, a gold color may be formed by a combination of the wavelengths for red and yellow or a green color may be formed by a combination of yellow and blue. A dominant wavelength, where one light source consists of multiple wavelength spectrums from the light source rather than one single wavelength, can also assist in determining color of a razor blade in the present invention.

Another technique of the present invention for determining color on a razor blade comprises matching or equating the color on the razor blade with that of one from a precise color standard such as that of the proprietary numbering and pigment value system of Pantone LLC. The system of Pantone LLC provides a standard with thousands of colors where each color corresponds to a unique code or number.

The term "about" as used herein generally signifies approximately or around. When a range of numerals are given, e.g., "about 4 to about 40" is disclosed herein, the present invention contemplates +/−10 percent of each number. Thus, for clarity, if a reference is described as being "about 4 to about 40" signifies the range of "3.6 to 44" as being encompassed by the present invention since the range of 3.6 to 4.4 represents +/−10 percent of 4 and the range of 36 to 44 represents +/−10 percent of 40.

Referring to FIG. 1, a razor cartridge 8 includes a guard 10, a cap 12, and two blades 14 and 16. The first blade 14 is positioned between the guard 10 and the second blade 16. Thus, when the razor cartridge 8 is in use, the first blade 14 will contact the hair before the second blade 16. The first blade 14 has a first color 14*a*. A second blade 16 has a second color 16*a*, the second color 16*a* different than the first color 14*a* of the first blade 14.

To represent the color differences of the blades of the present invention in the figures herein, different shading, hatching or other lines are utilized to indicate that colors are different. For instance, the shading of first color 14*a* on first blade 14 is different than the hatching pattern of second color 16*a* on second blade 16. First color 14*a* is represented by shading of a blue color in FIG. 1. Second color 16*a* is represented by a hatching pattern for gray in FIG. 1.

The present invention as noted above, contemplates that the first color can correspond to a first attribute of the first blade and that the second color can correspond to a second attribute of the second blade, the second attribute a different attribute than that of the first attribute of the first blade.

Where a razor has multiple blades, as in FIG. 1, one or more blades can be designed with that attribute of blade cut forces and in particular reduced cutter forces while other blades can be designed to have higher cutter forces. This combination of different blades having differing cutter forces provides a shave having improved closeness while maintaining comfort. For instance, the first razor blade in a razor cartridge having a different cutter force than a cutter force of a second razor blade in the same razor cartridge can have a first color which is different than the second color of the second razor blade. This color difference can be communicated to the target user to indicate the differences in the razor blades or the type of razor cartridge offering (e.g., premium attributes for closeness). In FIG. 1, the second blade 16 can have an attribute for a cutter force that is higher than the cutter force of the first blade 14. The gray color 16*a* of the second blade 16 represents a blade having a high cutter force and the blue color 14*a* of the first blade 14 represents a blade having a low cutter force.

A cutter force is measured by the wool felt cutter test, which measures the cutter forces of the blade by measuring the force required by each blade to cut through wool felt. The cutter force of each blade is determined by measuring the force required by each blade to cut through wool felt. Each blade is run through the wool felt cutter 5 times and the force of each cut is measured on a recorder. The lowest of 5 cuts is defined as the cutter force.

Figure 2:
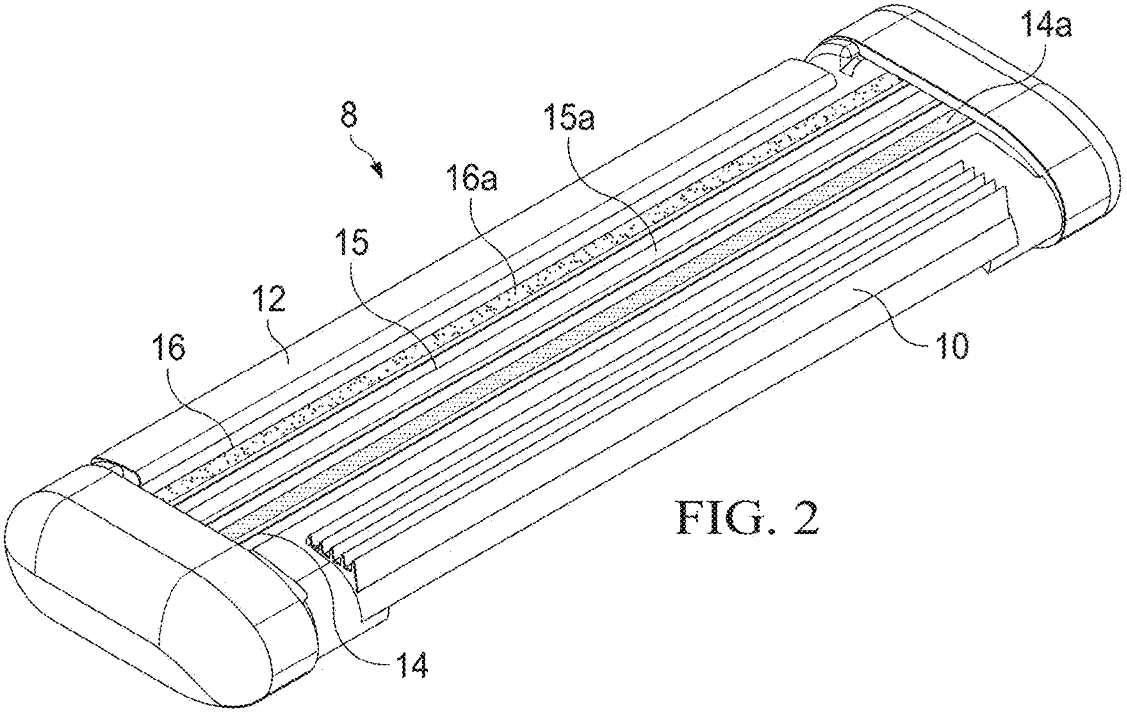
Figure 3:
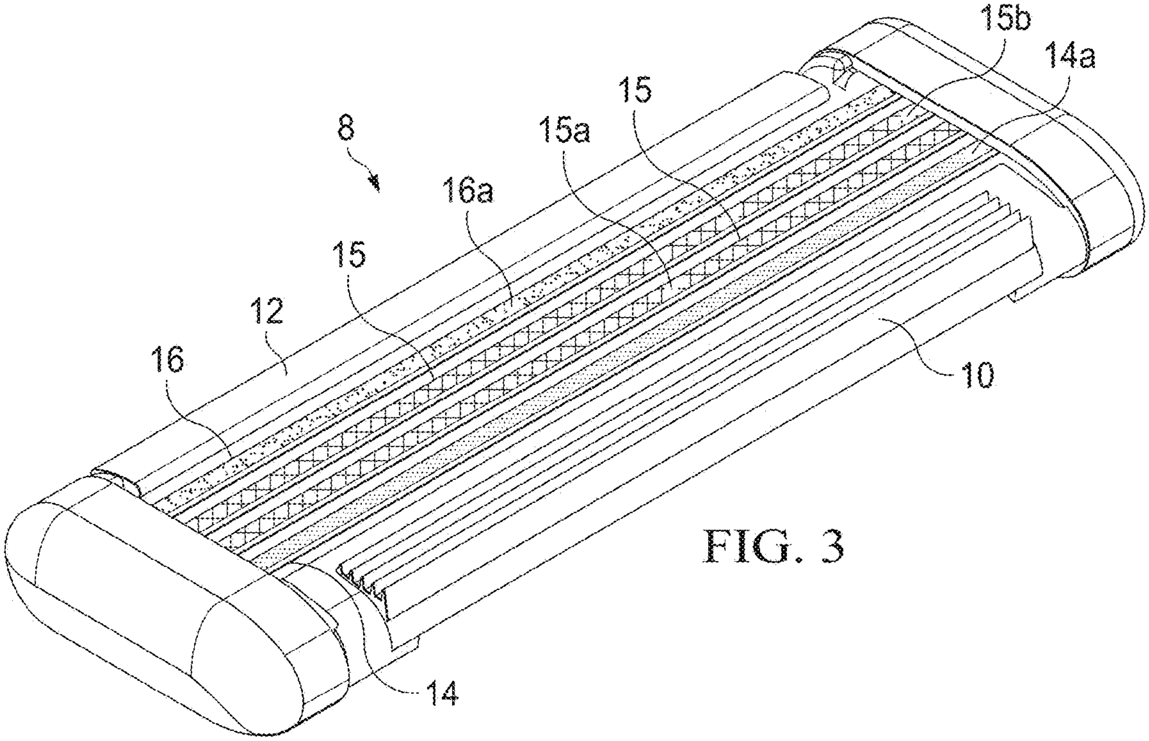
Figure 4:
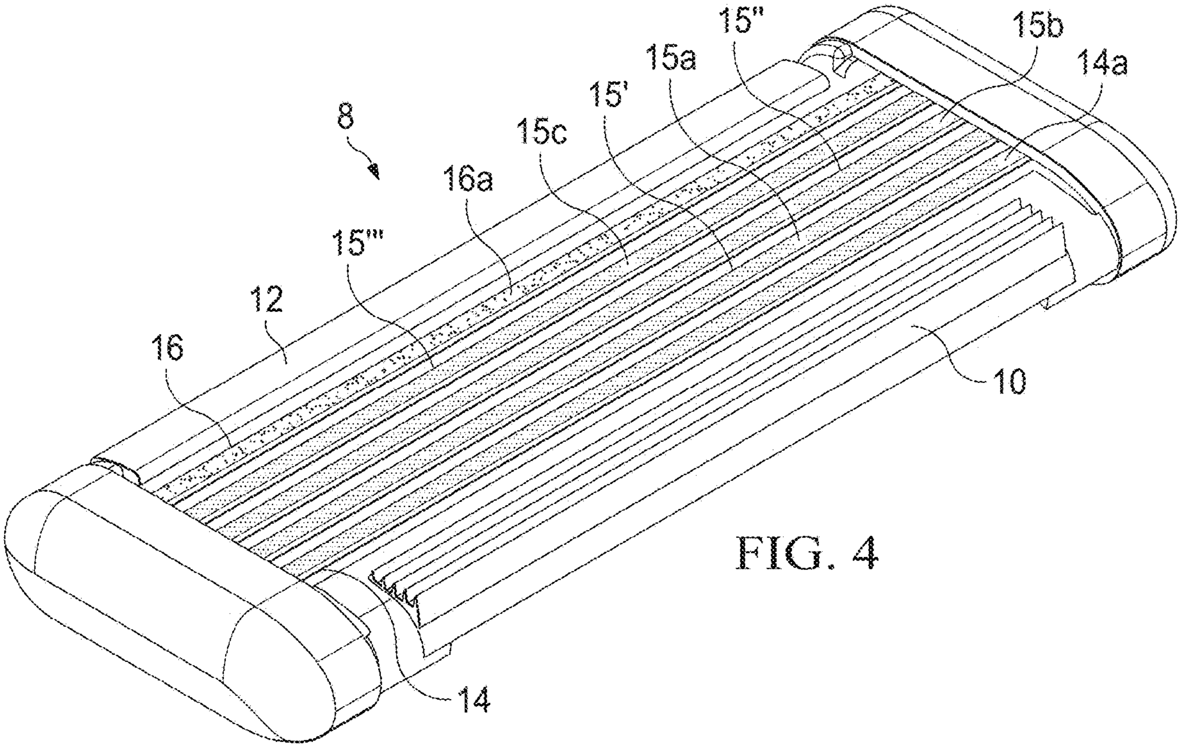

Referring to FIGS. 2-4, other razor cartridges can include a guard, a cap, and multiple blades (three, four, five or more blades respectively). In each instance a first blade 14 is positioned between a guard 10 and the second blade 16. At least one pair of razor blades in the razor cartridges of FIGS. 2-4 have dissimilar colors.

As depicted in FIG. 2, the razor cartridge 8 has three blades. The first blade 14 is the blade with a first color 14*a* and positioned closest to the guard 10 (i.e., in the principal position, slot 1). The second blade 16 having a second color 16*a* is positioned nearest the cap 12. A third blade 15 is positioned between the first blade 14 and the second blade 16. The third blade 15 may be identical in color to the first blade 14, identical in color to the second blade 16, or be a different color from the first blade 14 and the second blade 16. As shown, the first blade color 14*a* is hatched for a red color, the second blade color 16*a* is hatched for a blue color, and the third blade color 15*a* of the third blade 15 is hatched for a white color. Accordingly, the third blade color is not identical to the first blade color 14*a* or the second blade color 16*a*. The second blade 16 has a second color 16*a* different from the first color 14*a* and third color 15*a*. The three colors of the three blades are red, white, and blue corresponding to a flag of a country (e.g., USA) and the target user perhaps being a citizen of the country.

It should be noted that while the colors are different in FIG. 2, and any permutations of colors are contemplated in the present invention, directing the razor cartridge marketing to a target user, the first, second, and third blades may comprise the same or different attributes. For instance, the blades may all be identical, (e.g., all the same blade materials, etc.) or the first and second blades may be identical and the third blade different than the first and second blades, and so on. Any feasible permutations desired for attributes on the blades are contemplated in the present invention.

In another embodiment of the present invention, the first blade 14 has a different attribute than the second blade 16. For instance, the first blade 14 has higher cutter forces than the second blade 16. The first blade 14 may have the same or different attributes than the third blade 15. In the present invention, a first color of the first blade can be blue, and the second color may be any other color (e.g., silver or green) indicating the different attributes of the blades. Or alternately, if the blades are comprised of recyclable materials, the first color may be aqua or green to indicate that the razor can biodegrade or is recyclable and the second blade may be a white color to provide a contrasting color to the green. These colors are visible to a human eye.

As depicted in FIG. 3, the razor cartridge 8 can include four blades. The first blade 14 is the blade with a first color and positioned closest to the guard 10 (i.e., the principal position). The second blade 16 having a second color 16*a* is positioned in the fourth position from the guard 10, i.e., in the position nearest the cap 12. Two third blades 15, having colors 15*a* and 15*b* respectively, are positioned between the first blade 14 and the second blade 16. The third blades 15 may be identical in color to each other, to the first blade 14, to the second blade 16, or have different colors from the first blade 14 and the second blade 16 or from each other. As shown, the third blade colors 15*a* and 15*b* are identical, both hatched for a gold color. The first and second blade colors 14*a* and 16*a* are identical, both hatched for a cyan color.

The differences in color can distinguish the blade attributes. For instance, the difference between the first and second blade colors as compared to the third blades' color can correspond to these blade pairs having different attributes. The first blade 14 and the second blade 16, being the same color, can represent that these blades have the attribute of blade comfort while the third blades' color can comprise the attribute of blade tip size.

The present invention contemplates that while the blades with different colors have some of the same attributes, there is at least one attribute that is different between the different colored blades.

As depicted in FIG. 4, the razor cartridge 8 has five blades. The first blade 14 is the blade with a first color 14*a* and positioned closer or closest to the guard 10 (i.e., the principal position). The second blade 16 having a second color 16*a* is positioned in the fifth position from the guard 10, i.e., in the position nearest the cap 12. The first color 14*a* is different than the second color 16*a*. In the present invention, this color difference can correspond to an attribute difference between the first and second blades. The first blade, for example, can have lower cutter forces than the cutter forces of the second blade 16. Three third blades 15', 15", and 15'" are positioned between the first blade 14 and the second blade 16. The third blades 15', 15", and 15'" have colors 15*a*, 15*b*, and 15*c*, respectively. Colors 15*a*, 15*b*, 15*c* may be identical in color to the first blade color 14*a*, identical to the second blade color 16*a*, or have a configuration different from the first blade 14 and the second blade 16. As shown, the first blade is hatched for a blue color and the third blades 15', 15", and 15'" are hatched for a blue color and thus identical in color to the first blade 14. The colors being identical for the first blade and the three third blades 15', 15", and 15'" in this embodiment signifies that the attributes of these blades are substantially identical. On the contrary, since the second blade 16 is hatched for a silver or gray color 16*a*, the attributes of the second blade are different than those of the first blade and the three third blades.

It is also contemplated that one of the blades in the razor cartridge will not have a color disposed thereon. A blade with no color will be considered to have a steel gray color, the color of blade steel after processing.

For instance, if in FIG. 4, the second blade 16 had no color disposed thereon, it would be considered to have a steel gray color, differentiating it from the color of at least one of the other razor blades in the razor cartridge; in this arrangement shown in FIG. 4, a steel gray color is different from all the other razor blades which have a blue color.

While razor cartridges have been shown with two, three, four and five blades, razor cartridges having six or more blades may also be desirable.

Preferably, the blades are arranged within the razor cartridge such that they have a progressive geometry. An example of razor cartridges with blades arranged to have a progressive geometry is described in U.S. Pat. No. 6,212,777, incorporated herein by reference.

Figure 5:
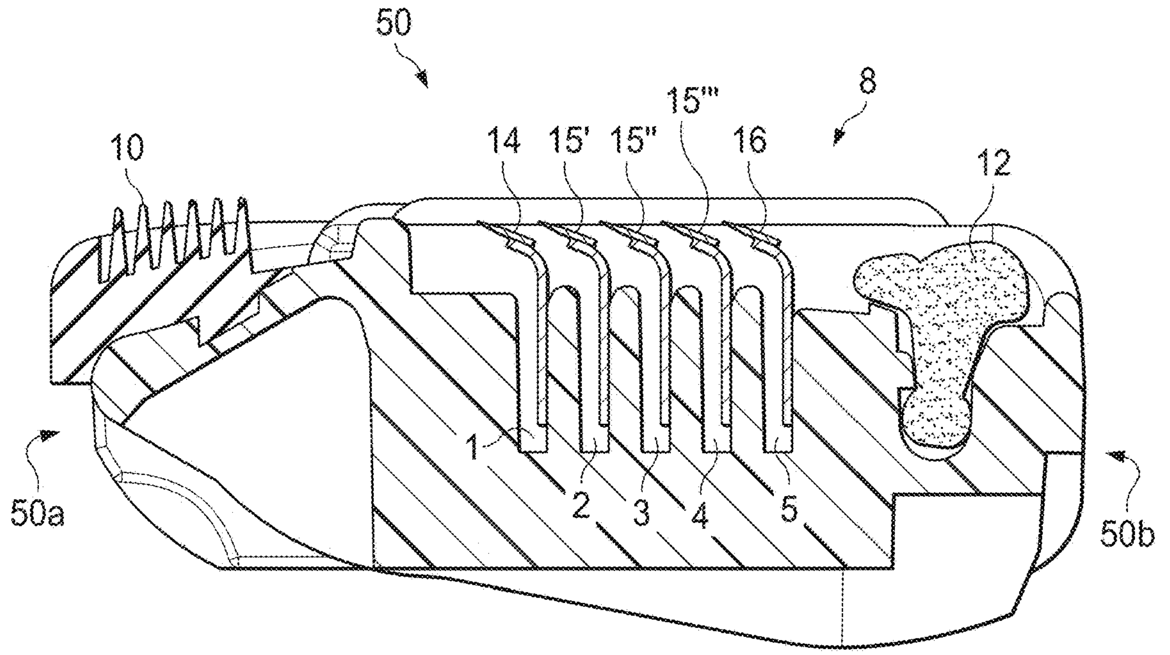
FIG. 5 is a cross-sectional view of an actual razor cartridge as shown in the embodiment of FIG. 4 having first, second, and third blades.

FIG. 5 shows a cross-sectional image 50 of an actual razor cartridge 8 of the embodiment depicted in FIG. 4 taken at a substantial midpoint of the cartridge. As can be seen, first blade 14 is disposed in a first position or blade slot 1 proximal to the guard structure 10 towards the front of the cartridge 50*a*, the second blade 16 is disposed in position or blade slot 5 proximal to the cap structure 12 towards the back of the cartridge 50*b*, and third blades 15 are in the middle section of slots, namely blades slots or positions 2, 3, and 4.

Figure 5A:
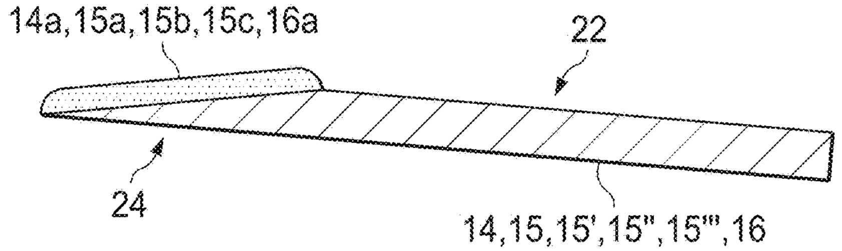
FIGS. 5A, 5B, and 5C are diagrammatic views illustrating a color disposed on a razor blade.
Figure 5B:
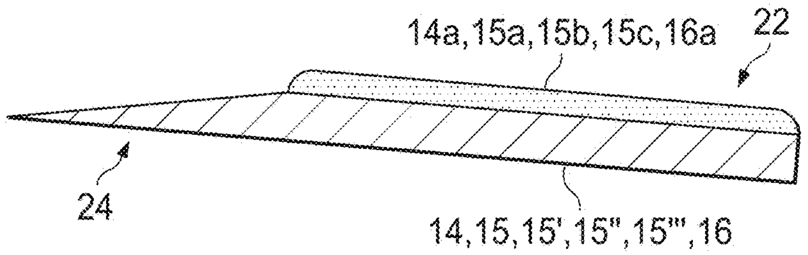
Figure 5C:
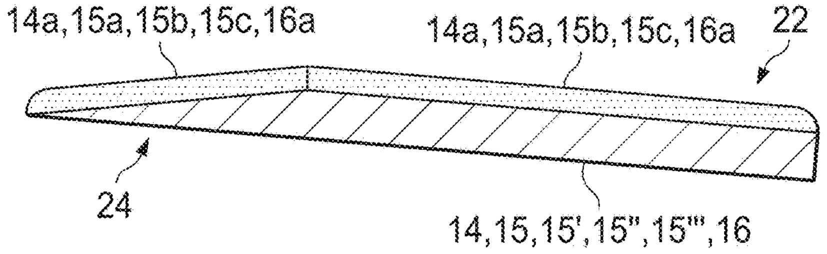

FIGS. 5A, 5B, and 5C are diagrams illustrating a portion of a razor blade comprising a color. The color is comprised within a coating disposed on the blades or within a substrate of the blades. The color 14*a*, 15, 15*a*, 15*b*, 15*c*, 16*a*, can be disposed only on the razor blade 14, 15, 15', 15", 15'", 16 cutting edge portion 24 as shown in FIG. 5A, only on the blade body portion 22 as shown in FIG. 5B, or both the blade body portion 22 and cutting edge portion 24 as shown in FIG. 5C. Any method of providing color to the blades is contemplated in the present invention. Some examples of methods of deposition of color onto razor blades is described in U.S. Pat. Nos. 7,284,461 and 7,673,541 and further in US Patent Publication No. 2010/00043232, assigned to the Assignee hereof, and incorporated by reference in their entireties.

Figure 7:
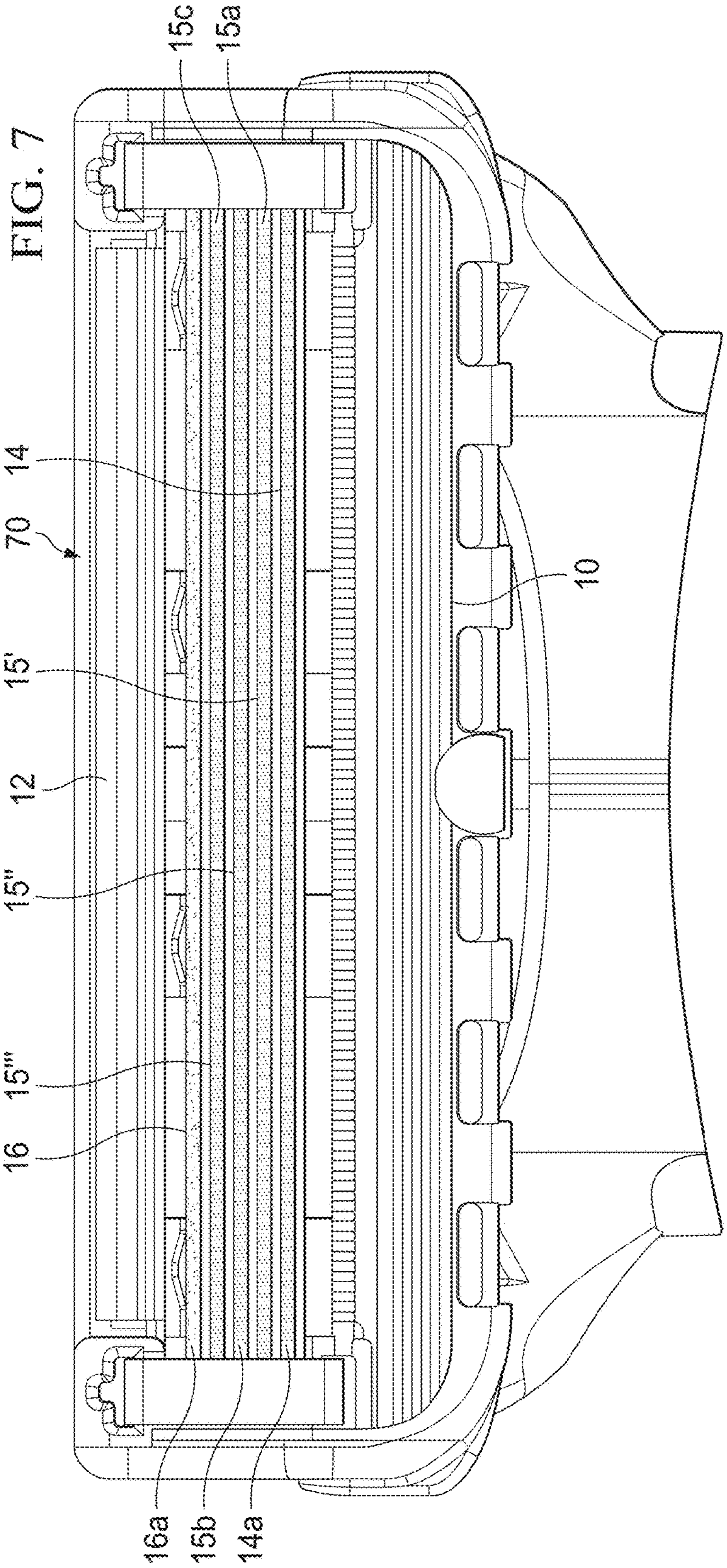
FIG. 7 is an embodiment of an actual razor cartridge of FIG. 4 illustrating first, second, and third blade colors.

FIG. 7 is an embodiment of an actual razor cartridge of FIG. 4 illustrating first and second blade colors. As can be seen, the first blade 14 and each of the third blades 15', 15", and 15'" comprise a blue color 14*a*, 15*a*, 15*b*, 15*c* (e.g., can hatched for blue) and the second blade 16 comprises a silver or steel gray color 16*a* (e.g., can be hatched for silver/steel gray). The attributes of the first blade and the third blades in this embodiment are substantially identical. It follows that their colors are also identical (e.g., all blue colored) in the present invention. The attribute of the second blade 16 is different, or different in value/amount than that of each of the first and third blades, respectively in this example. Accordingly, the color of the second blade is different (e.g., gray colored).

Figure 8:
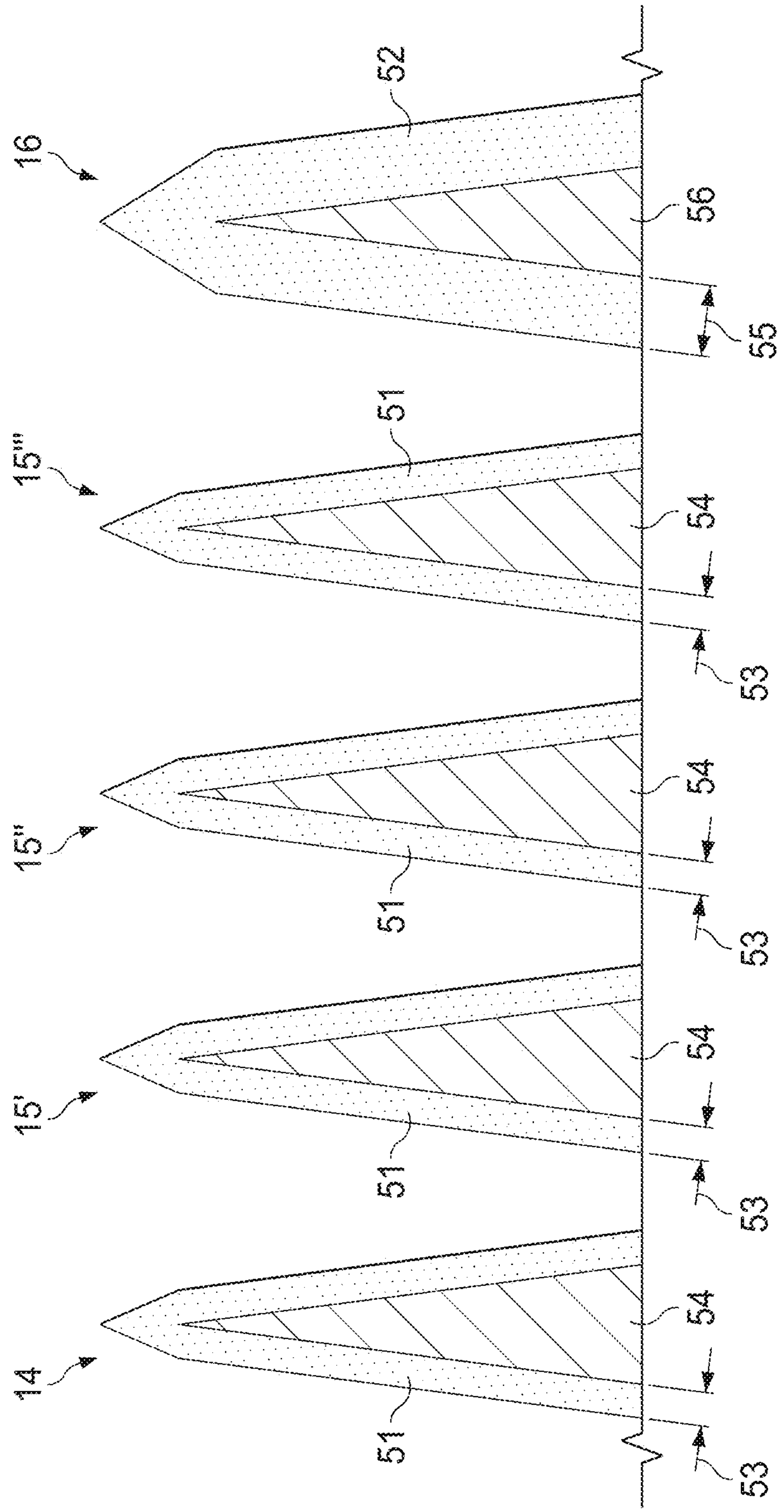
FIG. 8 is a diagrammatic view illustrating attributes of the razor blades of FIG. 7.

FIG. 8 is a diagrammatic view illustrating thickness attributes of the razor blades of FIG. 7. FIG. 8 shows that a coating 52 on the second blade 16 has a thickness 55 which is thicker than the coating 51 having a thickness 53 of first and third blades 14, and 15', 15", and 15'". In this arrangement, the coating thickness attribute difference is delineated by a difference in color in the present invention shown in FIG. 7.

In addition, the present invention contemplates that the first color and the second color can correspond to both a target user and an attribute. For instance, a blue colored blade 14*a*, 15*a*, 15*b*, 15*c* may correspond to both a male target user and have the attribute of low coating thickness or other attributes such as high cutter force. The embodiments of FIGS. 7-8 represent an illustration of such a razor cartridge. Any other feasible arrangements of colors being used for target user and corresponding attributes are also contemplated by the present invention.

Figure 9:
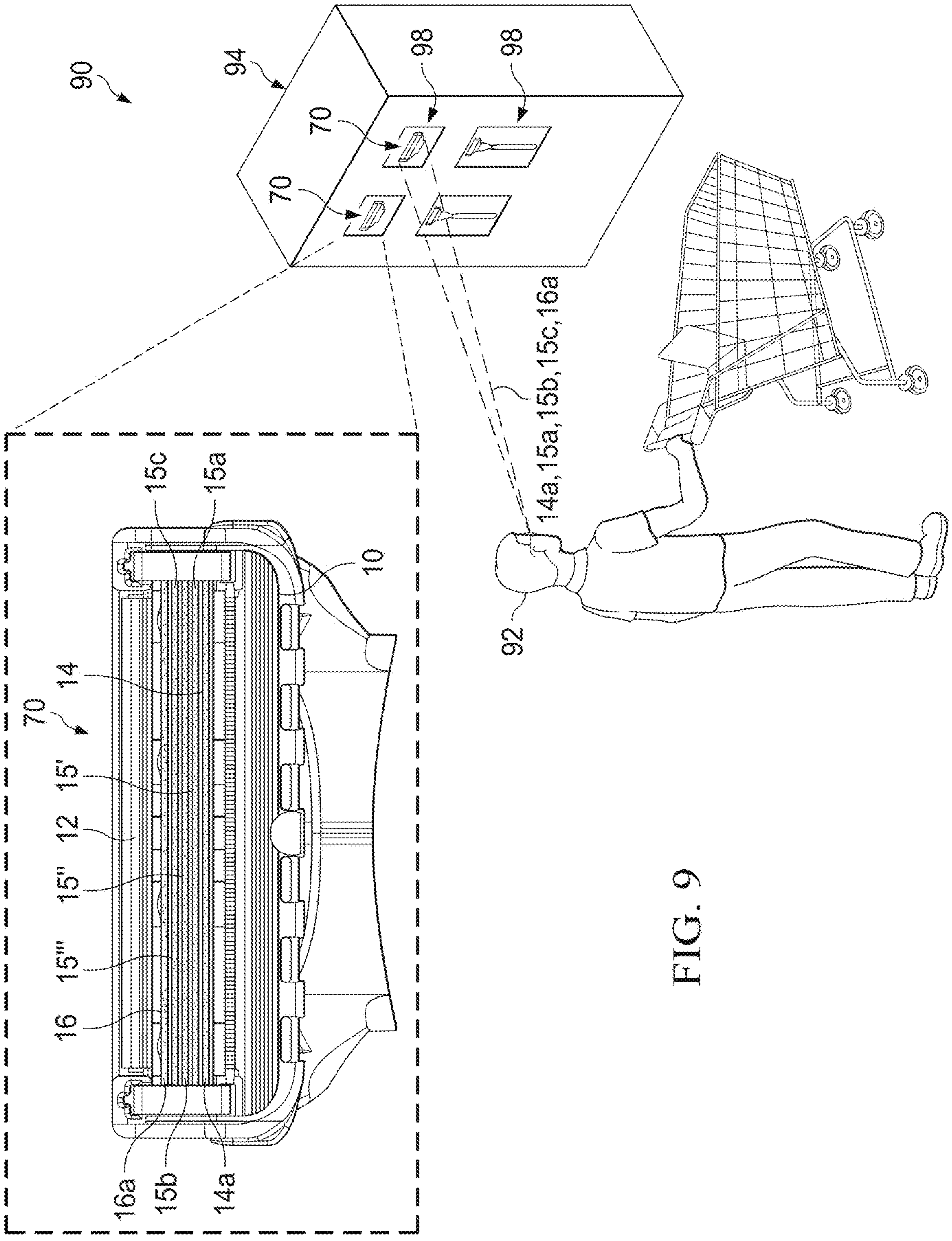
FIG. 9 is a diagram of a target user illustrating the visible colors of the razor blades in a merchandising system.

FIG. 9 is a diagram 90 of a target user 92 and a merchandising system 94 illustrating the visible colors of the razor blades 96 or razor packages 98 in the merchandising system 94. The human eye of the target user, which in this illustration appears as a shopper, can see the colors 14*a*, 15*a*, 15*b*, 15*c* 16*a*, of the blades 14, 15', 15", 15'", and 16 respectively of razor cartridges 70 in the razor packages 98 in the system 94. By seeing the colors of the blades, the target user/shopper 92 is not confused by the razor product offerings and has knowledge of what to purchase based on the knowledge of the colors, which colors are directed to a target user 92 or correspond to an attribute of the razor blade or razor cartridge.

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A razor cartridge comprising a plurality of razor blades, a first blade of said plurality of razor blades comprising a first color and a second blade of said plurality of razor blades comprising a second color, wherein said first color and said second color are different colors, said first blade designed to have a first cutter force and said second blade designed to have a second cutter force which is different than said first cutter force.

2. The razor cartridge of claim 1 wherein said first color is disposed on a blade body of said first blade, on a cutting edge of said first blade, or a combination thereof.

3. The razor cartridge of claim 1 wherein said second color is disposed on a blade body of said second blade, on a cutting edge of said second blade, or a combination thereof.

4. The razor cartridge of claim 1 wherein said first color has a wavelength between 380 nanometers and 740 nanometers.

5. The razor cartridge of claim 1 further comprising a third blade of said plurality of blades having a third color.

6. The razor cartridge of claim 5 wherein said third color is disposed on a body of said third blade, on a cutting edge of said third blade, or a combination thereof.

7. The razor cartridge of claim 5 wherein said third color is different than said first color, different than said second color, or different than both said first and said second colors.

8. The razor cartridge of claim 5 wherein said third color is the same color as said first color or the same color as said second color.

9. The razor cartridge of claim 1 comprising a third, fourth, and a fifth blade of said plurality of blades, at least one of said third, fourth, and fifth blades comprising a third color.

10. The razor cartridge of claim 1 wherein said different first and second colors are comprised of blue, gold, silver, bronze, red, pink, green, violet/purple, white, black, brown, orange, yellow, wavelengths thereof, or any combination thereof.

11. The razor cartridge of claim 1 wherein at least one of said different first and second colors is blue, gold, bronze, red, pink, green, violet/purple, white, black, brown, orange, yellow, pantones thereof, or any combination thereof.

* * * * *